US012632320B2

(12) United States Patent
Matsuzawa et al.

(10) Patent No.: US 12,632,320 B2
(45) Date of Patent: May 19, 2026

(54) INFORMATION PROCESSING APPARATUS AND INFORMATION PROCESSING METHOD

(71) Applicant: Hitachi, Ltd., Tokyo (JP)

(72) Inventors: Keiichi Matsuzawa, Tokyo (JP); Mitsuo Hayasaka, Tokyo (JP)

(73) Assignee: Hitachi Vantara, LTD., Kanagawa-Ken (JP)

( * ) Notice: Subject to any disclaimer, the term of this patent is extended or adjusted under 35 U.S.C. 154(b) by 442 days.

(21) Appl. No.: 18/462,545

(22) Filed: Sep. 7, 2023

(65) Prior Publication Data

US 2024/0330078 A1 Oct. 3, 2024

(30) Foreign Application Priority Data

Mar. 31, 2023 (JP) ................................. 2023-057828

(51) Int. Cl.
G06F 9/44 (2018.01)
G06F 9/54 (2006.01)

(52) U.S. Cl.
CPC ..................................... G06F 9/54 (2013.01)

(58) Field of Classification Search
CPC ....................................................... G06F 9/54
USPC ........................................................ 719/320
See application file for complete search history.

(56) References Cited

U.S. PATENT DOCUMENTS

| | | | |
|---|---|---|---|
| 8,261,295 B1* | 9/2012 | Risbood | H04L 41/145 |
| | | | 717/177 |
| 2014/0012862 A1* | 1/2014 | Kawamoto | G06F 16/245 |
| | | | 707/750 |
| 2014/0085660 A1* | 3/2014 | Kamisuwa | G06K 15/1803 |
| | | | 358/1.14 |
| 2015/0131119 A1* | 5/2015 | Narahashi | H04N 1/00206 |
| | | | 358/1.15 |
| 2020/0394088 A1 | 12/2020 | Takahashi et al. | |

FOREIGN PATENT DOCUMENTS

| | | |
|---|---|---|
| WO | 2016/093843 A1 | 6/2016 |
| WO | 2019/163623 A1 | 8/2019 |

* cited by examiner

*Primary Examiner* — Timothy A Mudrick
(74) *Attorney, Agent, or Firm* — Volpe Koenig

(57) ABSTRACT

Information regarding an API parameter of a target device is collected from the outside as a manual and knowledge, a description regarding a device configuration, a main parameter, and a specific parameter for which a value is to be set is extracted from the collected manual and knowledge, and a classification axis is created based on the device configuration and the main parameter included in the extracted description. An API execution log and configuration information are collected from the target device, the collected API execution log is classified according to the classification axis, a setting value of the specific parameter in the API execution log is aggregated for each classification, a most frequent setting value is determined as a default value of the parameter, and when the specific parameter is not set in the higher-level API call, the default value is set to make a lower-level API call.

12 Claims, 16 Drawing Sheets

| TIME | API NAME | PARAMETER | EXECUTION SUCCESSFUL/FAILED |
|------|----------|-----------|------------------------------|
| 2022/3/4 08:00 | create_volume | name=vol1 size=10GB | Success |
| 2022/3/4 08:30 | start_copy | source=vol1 target=vol2 | Success |
| 2022/3/4 09:00 | set_copy_option | id=copy1 speed=fast option123=on | Success |
| 2022/3/4 09:30 | create_volume | name=vol2 size=10GB | Failed |
| ... | ... | ... | ... |
| 23AA | 23AB | 23AC | 23AD |

23B

| ITEM | | SETTING VALUE | LAST UPDATE DATE | |
|---|---|---|---|---|
| DEVICE ID | | ABC12345 | 2020/10/1 | 23BAD |
| HARDWARE INFORMATION | MODEL NAME | Model900 | 2020/10/1 | 23BAD |
| | DISK TYPE | SSD | 2020/10/1 | 23BAD |
| | NUMBER OF DISKS | 50 | 2021/12/1 | 23BAD |
| | MEMORY CAPACITY | 128GB | 2021/12/1 | 23BAD |
| | FIRMWARE VERSION | v7.5 | 2022/2/5 | 23BAD |
| SOFTWARE INFORMATION | option123 | on | 2021/12/1 | 23BAD |
| | option456 | 3 | 2021/12/1 | 23BAD |

23BAA    23BAB    23BAC    23BA    23BB    23BC

COPY SETTING MANUAL

FOLLOWING COMMAND CAN INCREASE COPYING SPEED. 25AX set_copy_option id=vol1 speed=fast option123=on

COPY SETTING MANUAL

PLEASE SET PARAMETER id TO vol1 AND
PARAMETER option123 TO on TO EXECUTE set_copy_option API.

FOLLOWING INDICATES EXAMPLE OF COPY SETTINGS.

| API NAME | set_copy_option |
|---|---|
| id | vol1 |
| speed | fast |
| option123 | on |

IN CASE OF COPYING Volume

IN CASE WHERE MODEL IS Model900 AND DISK TYPE IS SSD,
WHEN HIGH SPEED (fast) IS DESIGNATED AS COPYING SPEED (speed) AND
option123 IS SET TO on,   COPYING IS COMPLETED WITHIN SHORT TIME.

| CLASSIFICATION AXIS | | | API PARAMETER: option123 | | |
|---|---|---|---|---|---|
| DEVICE CONFIGURATION | | MAIN PARAMETER | SETTING VALUE AND FREQUENCY | | DEFAULT VALUE |
| MODEL | DISK TYPE | speed | ON | OFF | |
| Model900 | HDD | middle | 2 | 5 | off |
| Model900 | SSD | fast | 8 | 1 | on |
| Model800 | HDD | low | 1 | 7 | off |
| ... | ... | ... | ... | ... | ... |

API NAME: set_copy_option

26BA 26C  26C  26C

26BC

26B

26BB

26AB

26AAB

26A

26AA

26AAA

| API NAME | MODEL | DISK TYPE | VALUE OF Speed 〜25A |
|---|---|---|---|
| set_copy_option | Model900 | SSD | fast |
| 25AA | 25AB | 25AC | 25AD |

25B

| TIME | DEVICE ID | VALUE OF option123 | EXECUTION SUCCESSFUL/FAILED |
|---|---|---|---|
| 2022/3/4 09:00 | ABC12345 | on | Success |
| 2022/3/4 15:00 | DEF77777 | off | Success |
| 2022/3/5 03:00 | ABC12345 | on | Success |
| 2022/3/5 06:00 | DEF77777 | on | Failed |
| 25BA | 25BB | 25BC | 25BD |

| API NAME | MODEL | DISK TYPE | VALUE OF Speed | 25A |
|---|---|---|---|---|
| set_copy_option | Model900 | HDD | medium | |
| 25AA | 25AB | 25AC | 25AD | |

| TIME | DEVICE ID | VALUE OF option123 | EXECUTION SUCCESSFUL/FAILED | 25B |
|---|---|---|---|---|
| 2022/3/4 10:00 | GHI00000 | on | Success | |
| 2022/3/4 16:00 | GHI00000 | off | Success | |
| ... | ... | ... | ... | |
| 25BA | 25BB | 25BC | 25BD | |

| API NAME | MODEL | DISK TYPE | VALUE OF Speed |
|----------|-------|-----------|----------------|
| set_copy_option | Model800 | SSD | fast |
| 25AA | 25AB | 25AC | 25AD |

25B

| TIME | DEVICE ID | VALUE OF option123 | EXECUTION SUCCESSFUL/FAILED |
|------|-----------|--------------------|-----------------------------|
| 2022/3/4 11:00 | XYZ99999 | on | Success |
| 2022/3/4 12:00 | XYZ99999 | on | Success |
| ... | ... | ... | ... |
| 25BA | 25BB | 25BC | 25BD |

INFORMATION PROCESSING APPARATUS AND INFORMATION PROCESSING METHOD

BACKGROUND OF THE INVENTION

1. Field of the Invention

The present invention relates to an information processing apparatus and an information processing method, and is suitable for application to, for example, an information processing apparatus that processes an application programming interface (API) call issued from an administrator and transmits the API call to a storage device. Note that, in the following description, calling an API or a command for calling an API is expressed as an API call, and generating an API call and transmitting the generated API call to another computer is expressed as "making an API call".

2. Description of the Related Art

In recent years, in the storage market, so-called hybrid cloud storage has been increasingly used in which an on-premises storage device owned by a customer and a storage service on a public cloud are used in cooperation.

In the management of the hybrid cloud storage, devices and services in a plurality of bases are to be managed. In this case, in a case where the respective devices and services are not unified, APIs used for management operations for the devices and the services are different. In such a case, the presence or absence, meanings, and effects of functions and parameters included in the APIs also vary depending on the devices and the services.

Therefore, when an administrator who does not have extensive knowledge about storage devices centrally manages the hybrid cloud storage, it is difficult for the administrator to appropriately set these parameters. This leads to an increase in man-hours of hybrid cloud storage management in use of the APIs and an increase in management cost due to an inappropriate setting.

As a known example of facilitating parameter designation in an API call, there is WO2019/163623. In WO2019/163623, a higher-level API that comprehensively makes a series of API calls is defined as a higher-level API than APIs of each device and each service. When an API user calls the higher-level API, the higher-level API calls the APIs of each device and each service in a predetermined order. In this case, in a case where the user does not designate a parameter necessary for the APIs of each device and each service, the higher-level API fills the parameter with a fixed default value defined in advance by the administrator and calls the APIs of each device and each service. As a result, the number of parameters to be designated by the user can be reduced.

Meanwhile, WO2016/093843 also exemplifies a prior example of automatically setting a parameter of a storage device. In WO2016/093843, a setting template for setting each parameter is generated from setting information of an existing storage device. To set a new storage device, the content of the setting template is modified according to the configuration of the new storage device, and a parameter according to the configuration of the new storage device is obtained. Since this procedure can be performed automatically, according to the invention described in WO2016/093843, similarly to WO2019/163623, the number of parameters to be set by a user can be reduced.

SUMMARY OF THE INVENTION

However, when the methods disclosed in WO2019/163623 and WO2016/093843 are applied to hybrid cloud storage service management, two problems remain.

The first problem is that in a storage device, an optimal value of a parameter varies depending on a device configuration. In a case where the method disclosed in WO2019/163623 is used, even for a device configuration for which a fixed default value is not suitable, an API designating the default value is called, which may cause failure requirements, such as performance degradation and stopping a device.

In addition, it is not possible to follow even in a case where an optimal default value changes over time. Examples of the case where the optimal default value changes over time include a case where the optimal default value changes due to a change in a device configuration such as renewal of hardware or renewal of firmware, and a case where knowledge of a parameter that becomes a problem is newly accumulated due to detection of a new failure case.

The second problem is that it is difficult to determine a default value. As described above, since storage devices have various device configurations and many parameters, knowledge and manual man-hours are required to determine the optimal value used in WO2019/163623. In WO2016/093843, unless an appropriate existing storage device is selected, an appropriate parameter cannot be set in a new storage device. Since there are various configurations and parameters of storage devices, knowledge and man-hours are still required to select an appropriate existing storage device.

The present invention has been made in view of the above points, and an object of the present invention is to propose an information processing apparatus and an information processing method that can facilitate setting of API parameters and reduce management cost.

In order to solve such a problem, according to the present invention, an information processing apparatus that makes a lower-level API call to a target device based on a higher-level API call made by a host computer includes: a first collection unit that collects, as a manual and knowledge, information regarding an API parameter of the target device from the outside; a classification axis creation unit that extracts a description regarding a device configuration, a main parameter, and a specific parameter for which a value is to be set from the manual and knowledge collected by the first collection unit and creates a classification axis based on the device configuration and the main parameter included in the extracted description; a second collection unit that collects an API execution log and configuration information from the target device; a classification unit that classifies the API execution log collected by the second collection unit according to the classification axis; a determination unit that aggregates a setting value of the specific parameter in the API execution log for each classification, and determines a most frequent setting value as a default value of the specific parameter; and a processing unit that transmits, to the device, the lower-level API call obtained by setting, in the higher-level API call, the default value corresponding to a combination of the device configuration of the target device and the main parameter in the higher-level API call as a value of the specific parameter in a case where the specific parameter is not set in the higher-level API call.

In addition, according to the present invention, an information processing method that is performed by an information processing apparatus that makes a lower-level API call to a target device based on a higher-level API call made by a host computer includes: collecting, as a manual and knowledge, information regarding an API parameter of the target device from the outside; extracting a description regarding a device configuration, a main parameter, and a specific parameter for which a value is to be set from the manual and knowledge collected and creating a classification axis based on the device configuration and the main parameter included in the extracted description; collecting an API execution log and configuration information from the target device; classifying the collected API execution log according to the classification axis; aggregating a setting value of the specific parameter API in the execution log for each classification, and determining a most frequent setting value as a default value of the specific parameter; and transmitting, to the device, the lower-level API call obtained by setting, in the higher-level API call, the default value corresponding to a combination of the device configuration of the target device and the main parameter in the higher-level API call as a value of the specific parameter in a case where the specific parameter is not set in the higher-level API call.

According to the information processing apparatus and the information processing method according to the present invention, an administrator can make an API call to the target device without designating all API parameters necessary for the lower-level API call by himself/herself. As a result, it is possible to save the effort of the administrator such as learning and man-hours for setting an API parameter necessary for managing the target device.

According to the present invention, it is possible to implement an information processing apparatus and an information processing method capable of reducing the cost for managing an entire system.

BRIEF DESCRIPTION OF THE DRAWINGS

FIG. 4 is a table illustrating an example of a configuration of an API execution log management table;

FIGS. 6A to 6D are diagrams illustrating examples of a manual and knowledge;

FIG. 7 is a table illustrating an example of a configuration of a default value management table;

FIG. 9A is a diagram illustrating an example of a configuration of classified API execution case data;

FIG. 9B is a diagram illustrating an example of a configuration of classified API execution case data;

FIG. 9C is a diagram illustrating an example of a configuration of classified API execution case data;

DESCRIPTION OF THE PREFERRED EMBODIMENTS

Hereinafter, embodiments of the present invention will be described in detail with reference to the drawings.

Figure 1:
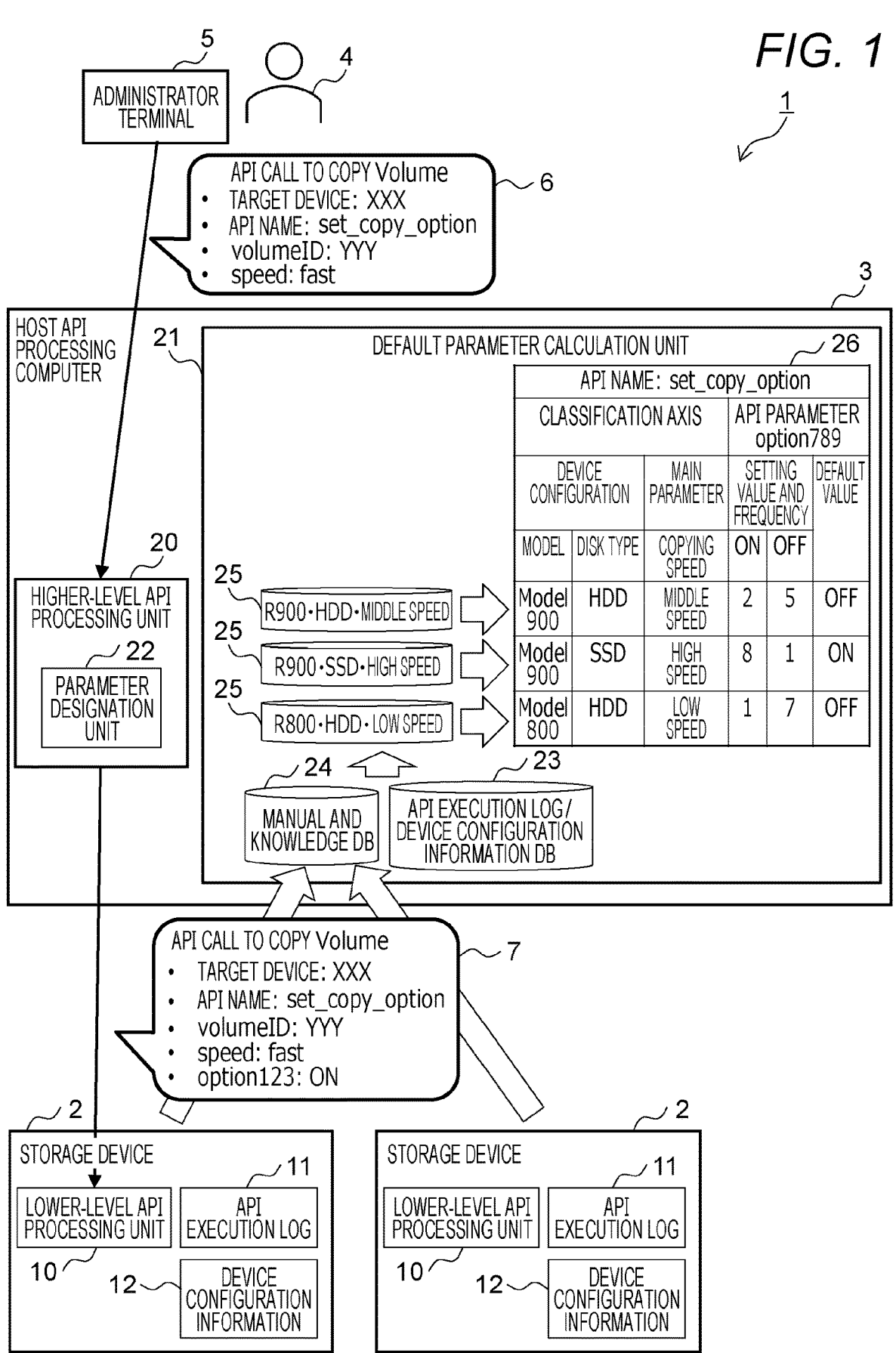
FIG. 1 is a block diagram conceptually illustrating a configuration of a hybrid cloud storage system according to a first embodiment.

(1) First Embodiment (1-1) Schematic Configuration of Hybrid Cloud Storage System FIG. 1 illustrates a schematic configuration of a hybrid cloud storage system 1 according to the present embodiment. The hybrid cloud storage system 1 includes a plurality of storage devices 2 and a host API processing computer 3 connected to the storage devices 2 via a network (not illustrated) such as the Internet.

Each of the storage devices 2 is a device that stores and processes data in response to a request from a host computer (not illustrated), and includes a lower-level API processing unit 10 as a functional unit. In addition, each of the storage devices 2 holds an API execution log 11 and device configuration information 12 as information.

The lower-level API processing unit 10 provides an API for changing a setting of the storage device 2, and has a function of performing setting according to a lower-level API call 7 given from the host API processing computer 3 as described later. The behavior of the storage device 2 is changed according to the content of the setting according to the lower-level API call 7.

In addition, the API execution log 11 is a list of call histories of the lower-level API called in the past, and the device configuration information 12 is information regarding settings, operation statuses, and a failure of the storage device 2 at present and in the past.

The host API processing computer 3 is a computer that provides an application programming interface (hereinafter, this is referred to as a higher-level API) for managing the storage devices 2 to a computer (hereinafter, this is referred to as an administrator terminal) 5 used by an administrator 4, and includes a higher-level API processing unit 20 and a default parameter calculation unit 21.

The higher-level API processing unit 20 is a functional unit having a function of generating a parameter-designated API call (hereinafter, this is referred to as a lower-level API call 7) according to an API call (hereinafter, this is referred to as a higher-level API call 6) transmitted from the administrator terminal 5 in response to an operation of the administrator 4, and transmitting the generated lower-level API call 7 to the storage devices 2.

The higher-level API processing unit 20 includes a parameter designation unit 22. The parameter designation unit 22 has a function of compensating a parameter with a default value calculated in advance for the parameter in a case where the higher-level API call 6 is given from the administrator terminal 5 and the parameter is required by a lower-level API and is not included in the higher-level API call 6.

The default parameter calculation unit 21 is a functional unit having a function of calculating the default value, and includes an API execution log/device configuration information database 23, a manual and knowledge database 24, classified API execution case data 25, and a default value management table 26.

The API execution log/device configuration information database 23 is a database storing the API execution logs 11 and the device configuration information 12 collected from the storage devices 2.

In addition, the manual and knowledge database 24 is a database storing information (hereinafter, this is referred to as a manual and knowledge) such as sentences extracted from a document regarding the storage devices 2 written by experts (persons) who have knowledge about the storage devices, 2 and are an administrator, a developer, and a user of the storage devices 2.

The classified API execution case data 25 is data (hereinafter, this is referred to as classified API execution case data) obtained by classifying the API execution logs 11 and the device configuration information 12 stored in the API execution log/device configuration information database 23 according to a classification axis defined in the default value management table 26. Details of the "classification axis" will be described later.

The default value management table 26 is a table storing the classification axis for defining a default value of a parameter of the API (hereinafter, this is referred to as a lower-level API) in each of the storage devices 2, frequencies of past cases, and a default value determined based on the classification axis and the frequencies of the past cases.

The administrator 4 is an administrator of the storage devices 2 or the like who makes the higher-level API call 6 to the host API processing computer 3 using the own administrator terminal 5.

Based on the higher-level API call 6, the parameter designation unit 22 of the higher-level API processing unit 20 of the host API processing computer 3 refers to the default value management table 26 managed by the default parameter calculation unit 21, and generates the lower-level API call 7 that is not present in the higher-level API call 6 but in which a parameter necessary for lower-level API processing is filled. The parameter designation unit 22 transmits the generated lower-level API call 7 to a target storage device 2 among the storage devices 2 to call the lower-level API processing unit 10 of the storage device 2 and operate the storage device 2.

Figure 2:
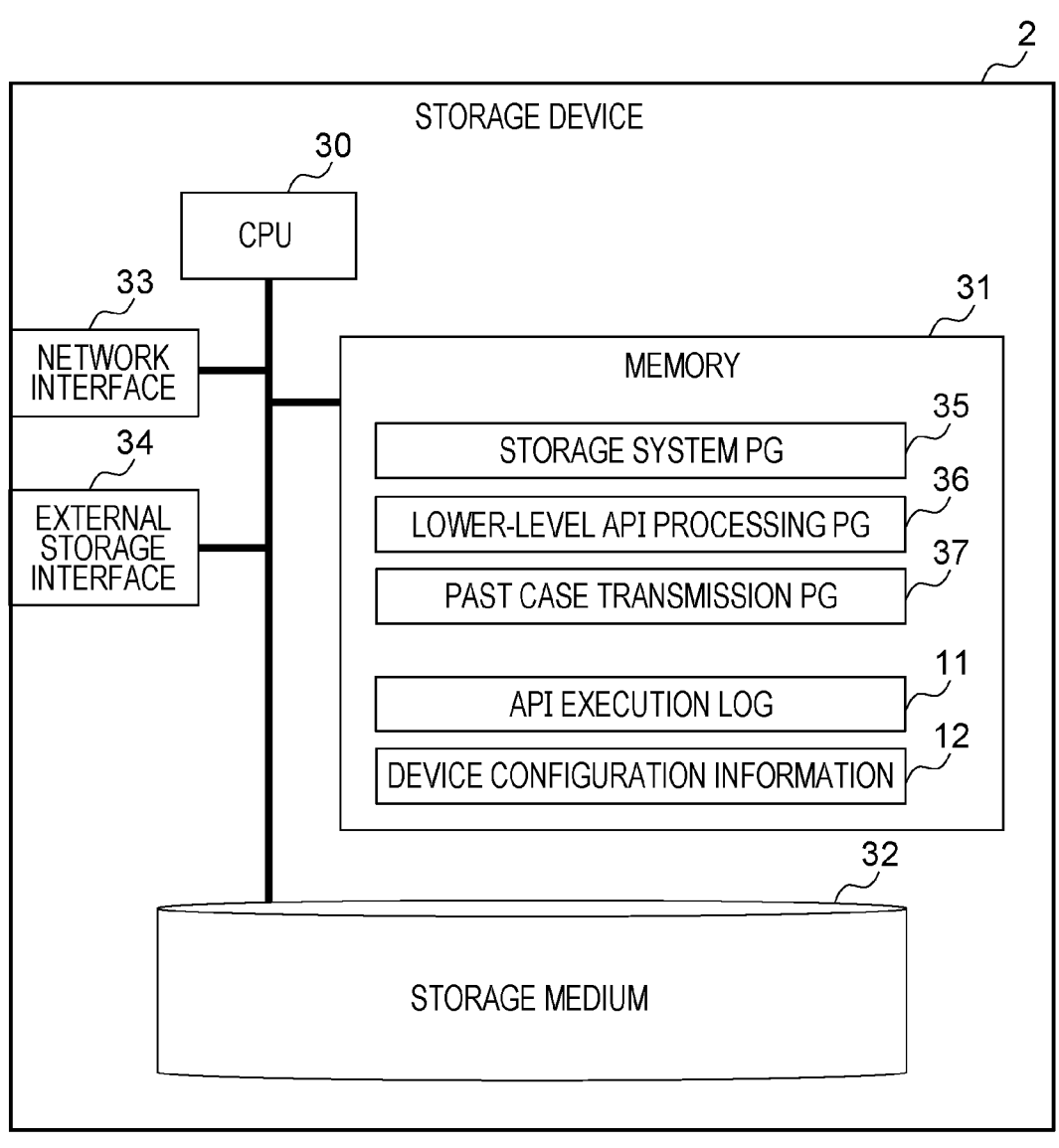
FIG. 2 is a block diagram illustrating a configuration of a storage device.

FIG. 2 illustrates a specific example of a configuration of the storage device 2. As illustrated in FIG. 2, each of the storage devices 2 includes a central processing unit (CPU) 30, a memory 31, a storage medium 32, a network interface 33, and an external storage interface 34.

The CPU 30 is a processor that controls the operation of the entire storage device 2. As described later, the CPU 30 executes a program stored in the memory 31 to execute various types of processing as the entire storage device 2.

The memory 31 includes, for example, a volatile semiconductor memory such as a random access memory (RAM) and a nonvolatile semiconductor memory such as a read only memory (ROM). The memory 31 is used not only as a working memory of the CPU 30 but also for holding various programs.

Actually, in the present embodiment, the memory 31 stores a storage system program 35, a lower-level API processing program 36, and a past case transmission program 37 as programs, and stores the API execution log 11 and the device configuration information 12 as data.

The storage system program 35 is a program having a function of executing processing of storing and processing data in response to a request from the host computer (not illustrated).

In addition, the lower-level API processing program 36 is a program having a function of receiving the lower-level API call 7 (FIG. 1) from the host API processing computer 3 (FIG. 1) and changing the behavior of the storage system program 35 according to the value of the parameter in the received lower-level API call 7.

Further, the past case transmission program 37 is a program having a function of transmitting the API execution log 11 and the device configuration information 12 to the host API processing computer 3 in response to a request from a past case collection program 52 of the host API processing computer 3 described later with reference to FIG. 3.

The API execution log 11 is a log of a past execution history of the lower-level API call 7 as described above, and the device configuration information 12 is information regarding the device configuration of the storage device 2. The API execution log 11 and the device configuration information 12 may be stored in a place other than the memory 31 as long as the API execution log 11 and the device configuration information 12 are accessible from the storage system program 35, the lower-level API processing program 36, and the past case transmission program 37. For example, the API execution log 11 and the device configuration information 12 may be stored in a part of the storage medium 32 or may be stored in a database constructed on another computer.

The storage medium 32 includes, for example, a large-capacity nonvolatile storage medium such as a hard disk device, a solid state drive (SSD), or a digital versatile disc (DVD), and is used to store data given from the host computer.

In addition, the network interface 33 is used to communicate with the host API processing computer 3 connected via the network (not illustrated). As communication protocols in this case, protocols such as Transmission Control Protocol/Internet Protocol (TCP/IP) and HyperText Transfer Protocol (HTTP) constructed on TCP/IP can be used.

The external storage interface 34 is an interface for transmitting and receiving data provided from the host computer and to be stored and receiving an instruction to store and process the data. As the external storage interface 34, a host bus adaptor (HBA) or a small computer system interface (SCSI) target device compatible with an optical fiber can be applied.

Figure 3:
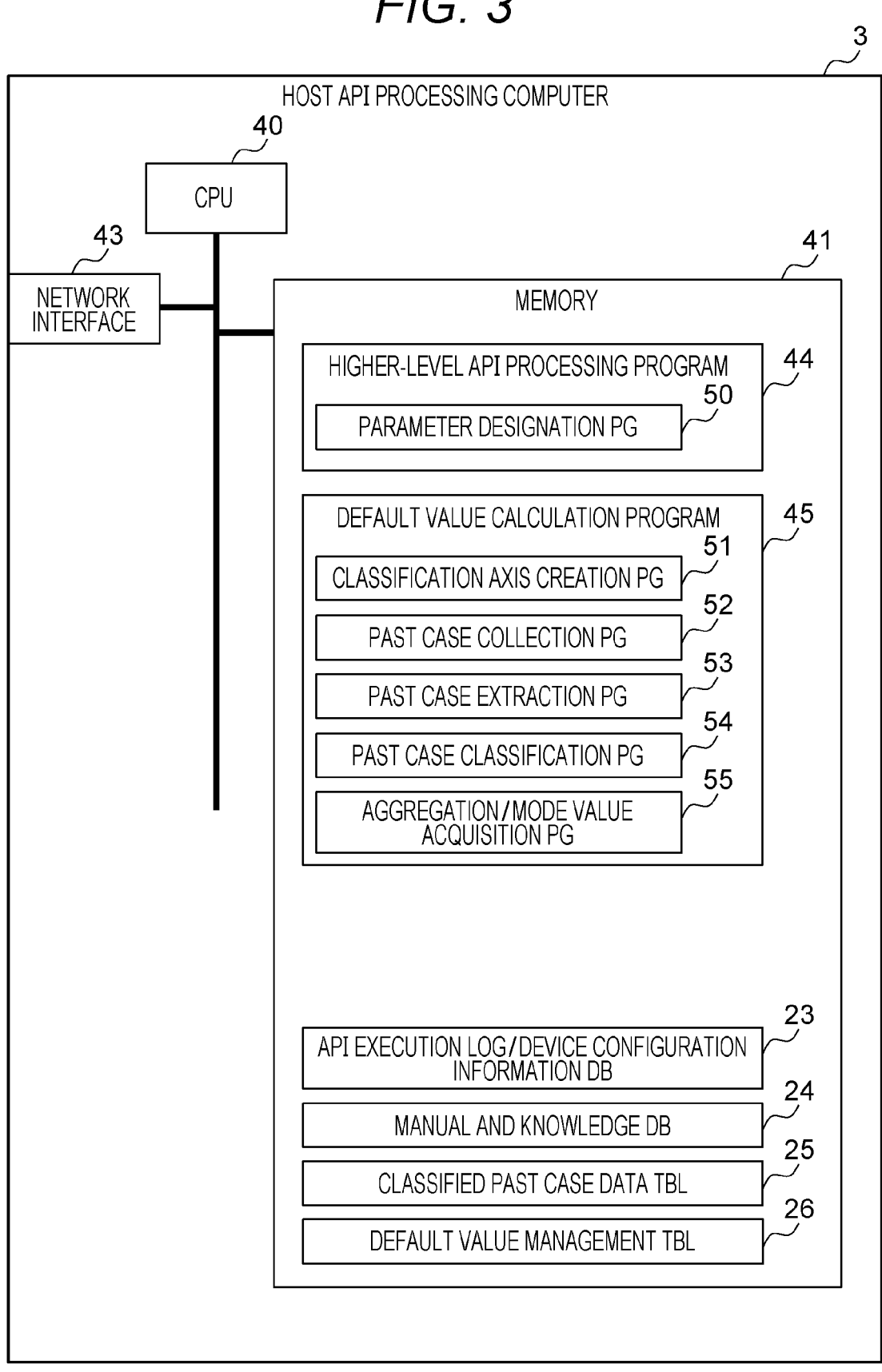
FIG. 3 is a block diagram illustrating a configuration of a host API processing computer according to the first embodiment.

FIG. 3 illustrates a specific example of a configuration of the host API processing computer 3. As illustrated in FIG. 3, the host API processing computer 3 includes a CPU 40, a memory 41, and a network interface 42.

The CPU 40 is a processor that controls the operation of the entire host API processing computer 3. As described later, the CPU 40 executes a program stored in the memory 41 to execute various types of processing as the entire host API processing computer 3. Note that, in the following description, a processing subject of various types of processing may be described as a "program", but it goes without saying that the CPU 40 actually executes the processing based on the program.

The memory 41 includes, for example, a volatile semiconductor memory such as a RAM and a nonvolatile semiconductor memory such as a ROM, and is used not only as a working memory of the CPU 40 but also for holding various programs and the like.

Actually, in the present embodiment, the memory 41 stores a higher-level API processing program 44 and a default value calculation program 45 as programs, and stores the API execution log/device configuration information database 23, the manual and knowledge database 24, the classified past case data 25, and the default value management table 26 as data.

The higher-level API processing program 44 is a program having a function of calling the corresponding lower-level API of the target storage device 2 according to the higher-level API call 6 (FIG. 1) transmitted from the administrator terminal 5 used by the administrator 4 described above with reference to FIG. 1. The higher-level API processing unit 20 illustrated in FIG. 1 is implemented by the CPU 40 executing the higher-level API processing program 44.

The higher-level API processing program 44 includes a parameter designation program 50. The parameter designation program 50 is a program having a function of appropriately designating a parameter for the lower-level API call 7 (FIG. 1) with reference to the default value management table 26 described later with respect to FIG. 7 when the higher-level API processing program 44 calls the corresponding lower-level API. The CPU 40 executes the parameter designation program 50 to implement the parameter designation unit 22 described above with reference to FIG. 1. Note that the higher-level API processing program 44 may store the content of the higher-level API call 6 to the API execution log/device configuration information database 23.

The default value calculation program 45 is a program having a function of calculating default values of various parameters required for the lower-level APIs. The CPU 40 executes the default value calculation program 45 to implement the default parameter calculation unit 21 described above with reference to FIG. 1.

The default value calculation program 45 includes a classification axis creation program 51, the past case collection program 52, a past case extraction program 53, a past case classification program 54, and an aggregation/mode value acquisition program 55.

The classification axis creation program 51 is a program having a function of creating a classification axis in the default value management table 26 with reference to the content of the manual and knowledge accumulated in the manual and knowledge database 24.

In addition, the past case collection program 52 is a program having a function of collecting, each storage device 2 to be managed and present in each place, the API execution log 11 (FIG. 2) and the device configuration information 12 (FIG. 2) held by each storage device 2 to be managed and present in each place and of storing the API execution logs 11 and the device configuration information 12 to the API execution log/device configuration information database 23 and collecting information such as a document about the storage devices 2 from a website or the like as the manual and the knowledge and storing the collected information to the API execution log/device configuration information database 23.

The past case extraction program 53 is a program having a function of extracting the API execution logs 11 and the manual and knowledge regarding the parameters of the lower-level APIs from the API execution log/device configuration information database 23 and the manual and knowledge database 24.

In addition, the past case classification program 54 is a program having a function of generating classified past case data 25 by classifying the API execution logs 11 and the manual and knowledge regarding the parameters of the lower-level APIs extracted by the past case extraction program 53 according to the classification axis described in the default value management table 26.

Further, the aggregation/mode value acquisition program 55 is a program having a function of performing aggregation processing based on the content of the classified past case data 25, determining a default value for each designated value for each of combinations of device configurations and main parameters of the storage devices 2 for each parameter, and storing the default values to the default value management table 26.

The network interface 43 is an interface having a configuration similar to those of the network interfaces 33 of the storage devices 2 described above with reference to FIG. 2, and is used to communicate with the administrator terminal 5 and the storage devices 2. As communication protocols in this case, protocols such as TCP/IP and HTTP constructed on TCP/IP can be used. For example, to accept a higher-level API or issue a lower-level API, a representational state transfer (REST) API can be used using HTTP.

FIG. 4 illustrates an API execution log management table 23A constituting a part of the API execution log/device configuration information database 23 stored in the memory 41 of the host API processing computer 3. The API execution log management table 23A is a table used to store and manage the API execution logs 11 collected from each storage device 2 by the past case collection program 52 of the default value calculation program 45 of the host API processing computer 3 described above with reference to FIG. 3. The API execution log management table 23A may be created for each storage device 2, or the API execution logs 11 collected from all the storage devices 2 may be stored in one API execution log management table 23A.

The API execution log management table 23A includes a time field 23AA, an API name field 23AB, a parameter field 23AC, and an execution successful/failed field 23AD. In the API execution log management table 23A, one entry (row) corresponds to an API execution log 11 of lower-level API processing executed in one lower-level API call 7.

Then, the time when the corresponding lower-level API processing is executed is stored in the time field 23AA, and the name of the lower-level API called in this case is stored in the API name field 23AB. In the parameter field 23AC, the name of each parameter whose value is designated in the corresponding lower-level API call 7 (FIG. 1) and the value designated in this case are stored. Furthermore, in the execution successful/failed field 23AD, information indicating whether or not the corresponding lower-level API processing has succeeded (whether or not the corresponding lower-level API processing has normally ended). FIG. 4 illustrates a case where "success" is stored in the execution successful/failed field AD when the corresponding lower-level API processing has succeeded, and "failed" is stored in the execution successful/failed field 23AD when the corresponding lower-level API processing has failed.

Therefore, in the case of FIG. 4, for example, the uppermost entry is an API execution log 11 of lower-level API processing executed by a lower-level API "create_volume" called at "08:00 on Mar. 4, 2022", and indicates that in the lower-level API call 7 of the lower-level API, the value of a parameter "name" is set to "vol1", the value of a parameter "size" is set to "10 GB" (that is, an instruction to create a volume "vol1" of "10 GB" ("create_volume")), and the execution result of the lower-level API was successful ("success").

Note that information other than time, API names, parameters, and execution successful/failed may also be managed by the API execution logs 11.

Figure 5:
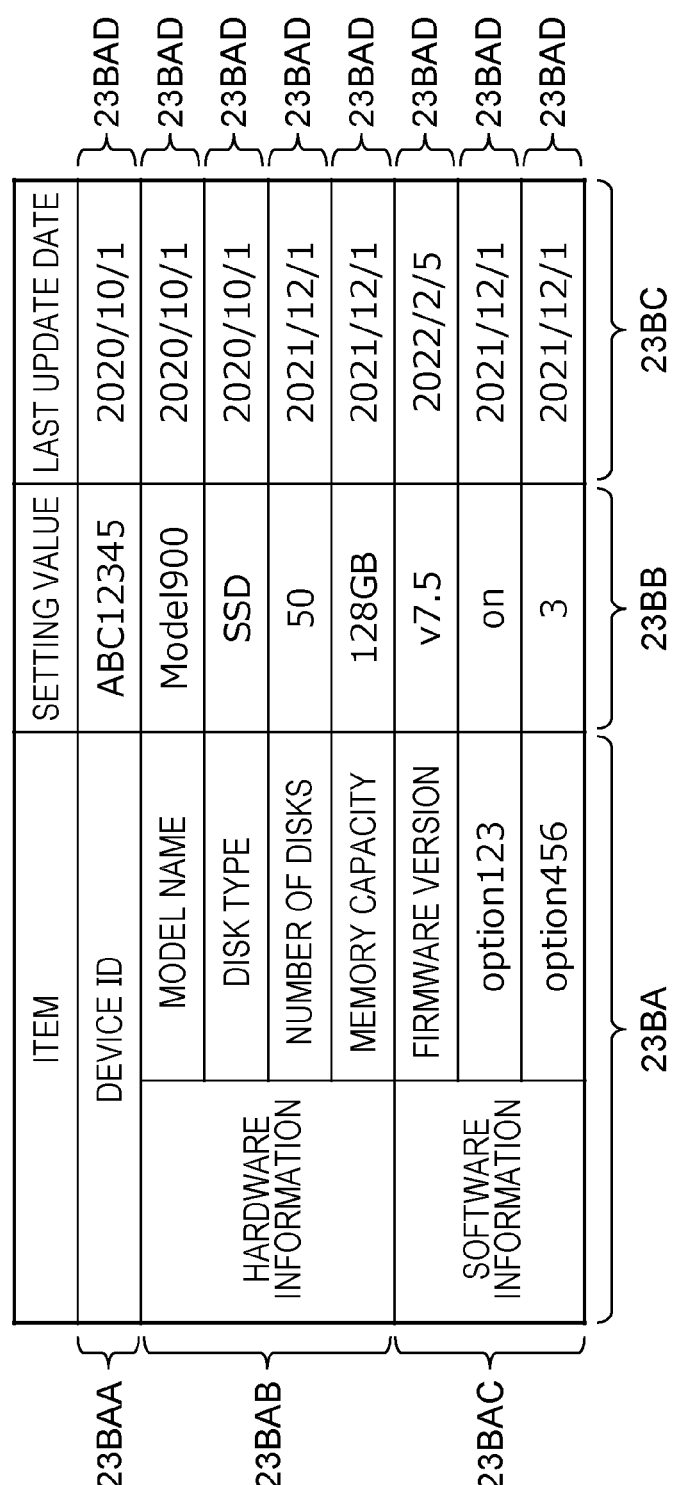
FIG. 5 is a table illustrating an example of a configuration of a device configuration information management table.

FIG. 5 illustrates a device configuration information management table 23B constituting a part of the API execution log/device configuration information database 23 stored in the memory 41 of the host API processing computer 3. The device configuration information management table 23B is a table used to store and manage the device configuration information 12 collected by the past case collection program 52 (FIG. 3) from each storage device 2, and is created for each storage device 2.

The device configuration information management table 23B includes an item field 23BA, a setting value field 23BB, and a last update date field 23BC. The item field 23BA is divided into a device ID field 23BAA, a hardware information field 23BAB, and a software information field 23BAC. Further, the hardware information field 23BAB is divided into small fields 23BAD (in FIG. 5, small fields 23BAD of "model name", "disk type", "number of disks", and "memory capacity") corresponding to main hardware configurations for the storage device 2. In addition, the software information field 23BAC is also divided into small fields 23BAD (in FIG. 5, small fields 23BAD of "firmware version", "option123", and "option456") corresponding to main software configurations implemented in the storage device 2.

The setting value field 23BB and the last update date field 23BC are classified into a plurality of small fields 23BAD corresponding to the device ID field 23BAA and the small fields 23BAD and 23BAD. Then, in each small field 23BAD of the setting value field 23BB, the current value of the corresponding item is stored. In each small field 23BAD of the last update date field 23BC, the date when the value stored in the corresponding small field 23BAD of the setting value field 23 is finally updated (and registered) is stored.

Therefore, the example illustrated in FIG. 5 indicates that the device ID of the corresponding storage device 2 is "ABC12345" and the last update date (here, the registration date) is "2020/10/1". In addition, FIG. 5 illustrates that the storage device 2 includes "50" "SSDs" and a memory of "128 GB" as hardware with a "model name" of "Model 900", the last update date of each small item of "model name" and "disk type" is "2020/10/1", and the last update date of each small item of "number of disks" and "memory capacity" is "2021/12/1".

Further, FIG. 5 illustrates that the "firmware version" of the storage device 2 is "v7.5" and is finally updated on "2022/2/5", software with and is "option123" "option456" implemented, "option123" is set to "on" on "2021/12/1", and "option456" is set to "3" on "2021/12/1".

Note that more hardware information and software information may be stored in the device configuration information management table 23B. Further, continuously time-varying values such as the free space of the disk and the data transfer speed may be sequentially stored in chronological order in the device configuration information management table 23B.

FIGS. 6A to 6D illustrate examples of a manual and knowledge 24A stored in the manual and knowledge database 24 (FIG. 3). The manual and knowledge 24A are information such as a document regarding the storage devices 2 written by such an expert as described above. For example, in addition to a manual of a storage product and knowledge of an expert disclosed on a website of the storage product, documents in which information regarding the storage devices 2 is written, such as specifications, writing in a product user forum, a product catalog, a failure case, and a customer story, also correspond to the manual and knowledge 24A. In the present embodiment, two types of sentences or the like among sentences or the like in these documents are used as the manual and knowledge 24A.

The first sentence is a sentence or the like including an example of a parameter, and the examples of FIGS. 6A to 6C correspond thereto. The examples in FIGS. 6A to 6C all show how each of "id", "speed", and "option123" has been set or will be set in a case where an API of "set_copy_option" is called.

For example, FIG. 6A illustrates an example in which an API name and a parameter value are designated in an API call field 24AX of the API call 7 in a command to call the API. Furthermore, FIG. 6B illustrates an example in which an API name and a parameter value are designated in a sentence described in a natural language, and FIG. 6C illustrates an example in which API names and parameter values are designated by listing parameter names of parameters and setting values of the parameters in a tabular form in pairs.

The second sentence is a reference regarding a device configuration regarding a parameter and another parameter, and the example illustrated in FIG. 6D corresponds thereto. FIG. 6D illustrates an example in which conditions of a device configuration (a model, a disk type, and the like) and another parameter (a copying speed) in which the copy time is shortened when "option123" is set to "on".

Meanwhile, FIG. 7 illustrates an example of a configuration of the default value management table 26 stored in the memory 41 (FIG. 3) of the host API processing computer 3. The default value management table 26 is a table used to manage a device configuration extracted from each manual and knowledge 24A (FIGS. 6A to 6D) stored in the manual and knowledge database 24 and a setting value of a main parameter in the device configuration, and is created for each of one or a plurality of API parameters.

As illustrated in FIG. 7, the default value management table 26 includes a classification axis field 26A and an API parameter field 26B. Then, in the classification axis field 26A, criteria for classifying past cases to be references in determining an API parameter ("option123" in the example illustrated in FIG. 7) for which a default value is to be defined are listed.

In the example illustrated in FIG. 7, "device configuration" and "main parameter" are defined as such criteria, and accordingly, the classification axis field 26A is classified into a device configuration field 26AA and a main parameter field 26AB. In the example illustrated in FIG. 7, "device configuration" is a combination of "model" and "disk type", and accordingly, the device configuration field 26AA is divided into a model field 26AAA and a disk type field 26AAB. Along with this, speed is designated as a main parameter in the main parameter field 26AB.

Therefore, in the example illustrated in FIG. 7, the "model", the "disk type", and the "speed" are listed as the "criteria for classifying past cases", and a combination of the "model", the "disk type", and the "speed" extracted from each manual and knowledge 24A is listed in the classification axis field 26A as a classification axis. Therefore, each entry 26C in the default value management table 26 corresponds to a combination of specific values of the "model", the "disk type", and the "speed" extracted from the manual and knowledge 24A.

The API parameter field 26B includes a target API parameter field 26BA, a setting value and frequency field 26BB, and a default value field 26BC. Then, a parameter name of a parameter for which a default value is to be set is stored in the target API parameter field 26BA. In the example illustrated in FIG. 7, "option123" corresponds to a parameter name of a parameter for which a default value is to be set.

In addition, in the setting value and frequency field 26BB, a setting value and a frequency of the setting value in a past case of a corresponding combination among combinations of specific values of the "criteria for classifying past cases" listed in the classification axis field 26A. In this case, the "past case" refers to a case of lower-level API processing corresponding to the API execution log 11 (FIG. 1) collected from each storage device 2 and accumulated in the API execution log/device configuration information database 23 (FIG. 1). That is, in the setting value and frequency field 26BB, all setting values of API parameters set in the lower-level API processing in the past and having parameter names stored in the target API parameter field 26BA, and frequencies of these setting values in a past case where the values of the device configuration and the main parameter are the corresponding values are stored.

Note that, in the example illustrated in FIG. 7, the setting values are two choices of "ON" and "OFF", but three or more types may be used, and in the case of a parameter taking a numerical value, items may be divided for each numerical value section, like a histogram.

Further, in the default value field 26BC, the default value of the API parameter calculated and determined based on the values stored in the setting value and frequency field 26BB and having the parameter name stored in the target API parameter field 26BA is stored. In the present embodiment, among setting values stored in the setting value and frequency field 26BB, a setting value (most frequent setting value) having the highest frequency is determined as the default value of the corresponding API parameter for the combination of the corresponding device configuration and the specific value of the main parameter, and the determined default value is stored in the default value field 26BC.

Therefore, in the example illustrated in FIG. 7, it is necessary to set the API parameter of "option123" in the lower-level API of "set_copy_option", and in the past cases, regarding the disk type of "HDD" with the speed of "middle" in the model of "Model 900", the number of past cases set to "ON" is "2", the number of past cases set to "OFF" is "5", and the default value of the API parameter of "option123" determined based on these past cases is "OFF".

Figure 8:
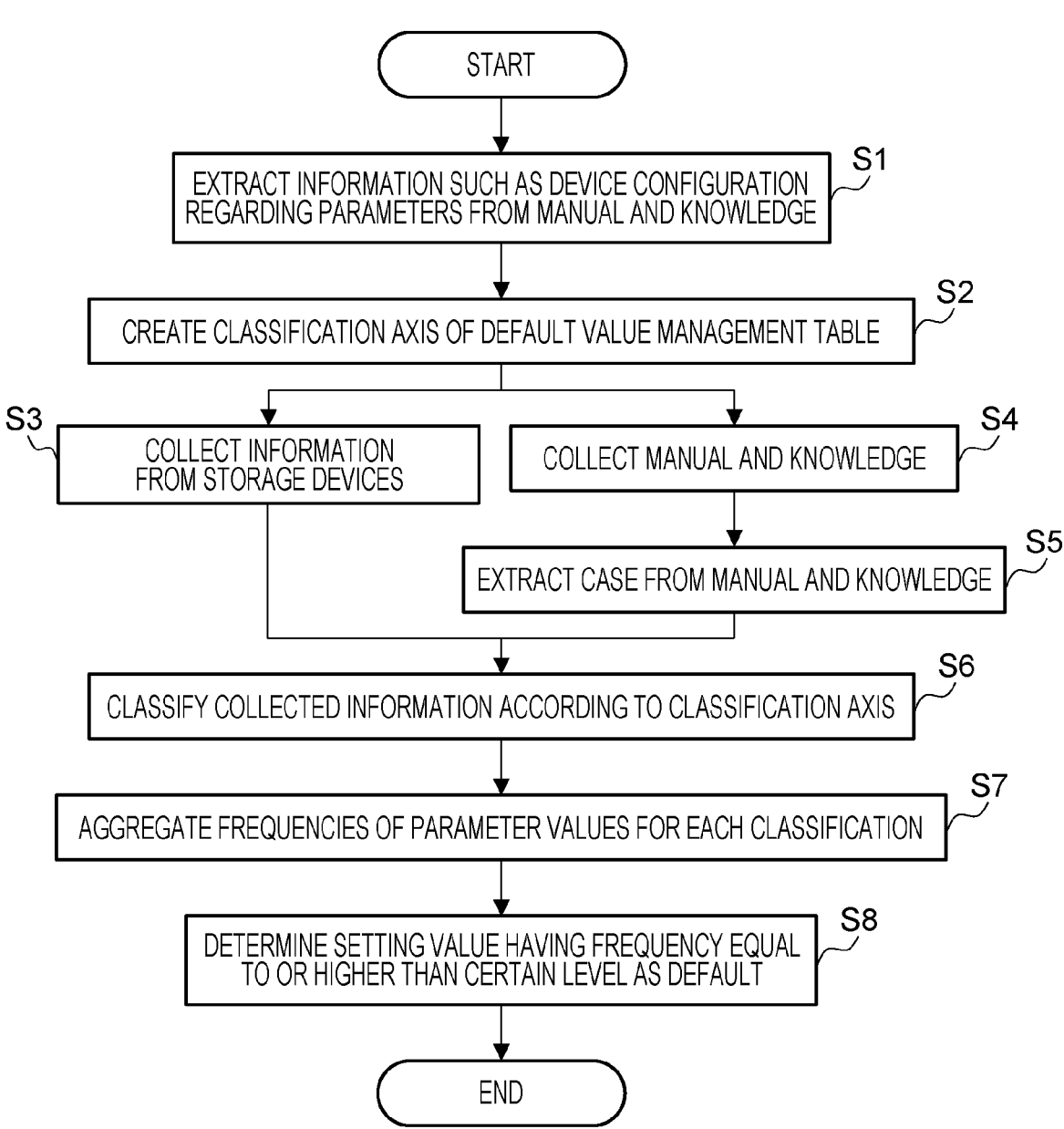
FIG. 8 is a flowchart illustrating a process procedure of a default value calculation process.

FIG. 8 illustrates a process procedure of a default value calculation process executed by the default value calculation program 45 (FIG. 3) of the host API processing computer 3. The default value calculation program 45 calculates a default value for each API parameter required in a lower-level API according to the process procedure illustrated in FIG. 8.

Note that this default value calculation process may be executed, for example, in response to an instruction from the administrator 4, may be executed every time a certain amount of information is accumulated in the API execution log/device configuration information database 23 (FIG. 3) over time, or may be executed periodically. In addition, steps of the default value calculation process may be continuously performed at one time, or may be performed at intervals for each step.

When this default value calculation process is started, the classification axis creation program 51 (FIG. 3) first extracts a description regarding various parameters including the main parameters of the storage devices 2 and parameters for which default values are desired to be set, from the manual and knowledge 24A accumulated in the manual and knowledge database 24 (S1). In addition, the classification axis creation program 51 acquires information regarding the device configurations and the various parameters included in each extracted description, and creates a classification axis based on the acquired information (S2).

In this case, various analysis methods for natural language can be used as a method of extracting the description regarding the device configurations and the various parameters and acquiring information of the device configurations and the parameters from the extracted description. For example, a list (hereinafter, this is referred to as a term list) of terms regarding the device configurations and the various parameters (including the main parameters) can be created in advance, a sentence of the manual and knowledge 24A is morphologically analyzed and decomposed into words, and each decomposed word is compared with a term included in the term list, whereby the desired device configurations and the various parameters can be extracted.

In this case, specific values regarding the device configuration and the various parameters may be acquired. For example, in a case where there is a description "in the case of the model 900" in a sentence, when it can be acquired from the term list that the word "model 900" is one of the parameters indicating models, the sentence can be said to be a sentence including a term regarding the device as the device configuration. In another example, syntactic parsing can be performed on documents accumulated in the manual and knowledge database 24, and nouns included in a subject and a predicate can be extracted as a device configuration and various parameters. Furthermore, regarding a table in a document, phrases described in each cell or itemized list of the table can be extracted as a device configuration and various parameters.

In the example illustrated in FIG. 6D, it is assumed that four words "device", "disk type", "speed", and "option123" shaded are matched with the terms in the term list described above. In addition, it is assumed that it has been recognized from the term list that "model" and "disk type" are words representing a device configuration and "speed" is a term representing a main parameter. In this case, the remaining "option123" is a parameter for which a default value is desired to be set.

Subsequently, the classification axis creation program 51 determines the device configuration and the main parameter of the classification axis and an API parameter based on the device configuration and various parameters extracted in step S2. In the example illustrated in FIG. 6D, "model" and "disk type" are determined as the device configuration, and "option123" is determined as the API parameter. Then, the classification axis creation program 51 creates an empty default value management table 26 (FIG. 7) in which no data is stored based on the results of the determination.

Next, the past case collection program 52 (FIG. 3) executes step S3, step S4, and step S5 in parallel. Since there is no dependency between step S3 and steps S4 and S5, the order in which steps S3, S4, and S5 are executed is not limited.

Specifically, the past case collection program 52 collects the API execution logs 11 and the device configuration information 12 held by each storage device 2 to be managed in each base, and stores the collected API execution logs 11 and the device configuration information 12 to the API execution log/device configuration information database 23 (FIG. 3) in the host API processing computer 3 (S3).

In this case, the past case collection program 52 stores the collected API execution logs 11 to the API execution log management table 23A described above with reference to FIG. 4, and stores the collected device configuration information to the device configuration information management table 23B.

In parallel with this, the past case collection program 52 collects sentences describing information regarding API parameters of the storage devices 2 present in the various places as the manual and knowledge 24A, and stores the collected manual and knowledge 24A to the manual and knowledge database 24 (S4).

As a method of collecting the sentences, a developer of the storage devices 2 should have already stored documents such as a manual and specifications, and a method of extracting and collecting sentences of corresponding portions from these documents can be considered. In addition, a website to which the user writes, or a customer of the storage devices 2 and the support department of the storage products can collect the sentences from information of a failure and a recorded sentence of the exchange of a solution to the failure.

Subsequently, the past case extraction program 53 (FIG. 3) extracts information of a case corresponding to a past case stored in the API execution log/device configuration information database 23 from the manual and knowledge 24A collected in the manual and knowledge database 24 as described above (S5). As an extraction method in this case, various methods such as natural language processing can be applied.

For example, in the example illustrated in FIG. 6A, it is possible to extract that the values of the parameters "id", "speed", and "option123" for calling of the API of "set_copy_option" are "vol 1", "fast", and "on", respectively, by analyzing an API call field 25AX.

In addition, also in the example illustrated in FIG. 6B, it is possible to extract that the values of the parameters "id" and "option123" are "vol1" and "on", respectively, by performing syntactic parsing on the described sentence.

Further, in the example illustrated in FIG. 6C, it is possible to extract that the values of the parameters "id", "speed", and "option123" for calling of the API of "set_copy_option" are "vol 1", "fast", and "on", respectively, by analyzing each field of the table.

Thereafter, the past case classification program 54 (FIG. 3) generates classified past case data 25 (FIG. 3) by classifying a case extracted by the past case extraction program 53 in step S5 and a past case based on the API execution logs 11 and the device configuration information 12 accumulated in the API execution log/device configuration information database 23 according to the classification axis created in step S2 (S6).

For example, in the example illustrated in FIG. 7, since the classification axis is the "device configuration" and the "main parameter", the past case classification program 54 generates classified past case data 25 by classifying the cases for each combination (hereinafter, referred to as a device configuration/main parameter value combination) of specific values of the device configuration and the main parameter.

FIGS. 9A to 9C illustrate examples of the classified past case data 25. The classified past case data 25 illustrated in FIGS. 9A to 9C has the same configuration and includes a classification condition table 25A and a past case table 25B.

The classification condition table 25A includes an API name field 25AA and fields 25AB to 25AD associated with the device configuration and the main parameter of the classification axis. FIGS. 9A to 9C are examples of a configuration of the classified past case data 25 corresponding to FIGS. 6A to 6C, and thus, in addition to the API name field 25AA, the model field 25AB, the disk type field 25AC, and the speed field 25AD respectively associated with "model", "disk type", and "speed" of the classification axis are provided.

The name (API name) of the API in which the default value of the parameter is to be set is stored in the API name field 25AA. Specific values of the model, the disk type, and the speed according to a device configuration/main parameter value combination are stored in the model field 25AB, the disk type field 25AC, and the speed field 25AD, respectively.

FIGS. 9A to 9C are examples of the classified past case data 25 regarding the API having the API name "set_copy_option". FIG. 9A illustrates a case where the values of the model, the disk type, and the speed in the device configuration/main parameter value combination are "Model 900", "SSD", and "fast", respectively. FIG. 9B illustrates a case where the values of the model, the disk type, and the speed are "Model 900", "HDD", and "medium", respectively. FIG. 9C illustrates a case where the values of the model, the disk type, and the speed are "Model 800", "SSD", and "fast", respectively.

The past case table 25B is a table in which information regarding the API execution log 11 that is the values of the model, the disk type, and the speed registered in the classification condition table 25A and corresponding to the values of the model, the disk type, and the speed in the device configuration/main parameter value combination in the past API execution log 11 in past API execution logs is registered.

The past case table 25B includes a time field 25BA, a device ID field 25BB, an option value field 25BC, and an execution successful/failed field 25BD. One entry (row) in the past case table 25B corresponds to one API execution log 11 (one API call) which is each value of the model, the disk type, and the speed registered in the classification condition table 25A and corresponding to each value of the model, the disk type, and the speed in the device configuration/main parameter value combination.

The time when the corresponding API is called is stored in the time field 25BA, and the device ID of the storage device 2 for which the API is to be called is stored in the device ID field 25BB. In addition, the designated value of the corresponding parameter set in the corresponding lower-level API call 7 (FIG. 1) is stored in the option value field 25BC, and information ("success" if the call has succeeded, "failed" if the call has failed) indicating whether the API call 7 has succeeded or failed is stored in the execution successful/failed field 25BD.

Subsequently, the aggregation/mode value acquisition program 55 (FIG. 3) refers to the classified past case data 25, and uses the setting value and frequency field 26BB (FIG. 7) of the default value management table 26 to aggregate a setting value of a parameter value and a frequency of the setting value for each device configuration/main parameter value combination of an API parameter for which a default value is desired to be set (S7).

In this case, the aggregation/mode value acquisition program 55 may perform aggregation by weighting individual execution histories with some criteria (weighting values of frequencies in the setting value and frequency field 26BB).

For example, an entry having a value of "failed" stored in the execution successful/failed field 25BD of the past case table 25B described above with reference to FIGS. 9A to 9C may not be counted (the weight may be set to "0"). In this manner, since a failure case of a lower-level API (case of the lower-level API processing that has not normally ended) is not included in the frequency aggregation, a more reliable default value can be determined in the next step S8.

In addition, it is also possible to take a measure such as increasing a weight value for a history of a device configuration of a device that is normally operated for a long period of time among the storage devices 2. Even in this case, as in the case described above, a more reliable default value can be determined in the next step S8.

Next, the aggregation/mode value acquisition program 55 refers to the setting value and frequency field 26BB for each entry (each device configuration/main parameter value combination) of the default value management table 26 and determines a setting value having a frequency equal to or higher than a certain level as the default value of the corresponding API parameter in the corresponding device configuration/main parameter value combination (S8).

For example, in the case of a device configuration/main parameter value combination in which the values of the model, the disk type, and the speed in FIG. 7 are "Model 900", "HDD", and "medium", respectively, since the frequency of the setting value of "ON" is "8" and the frequency of the setting value of "OFF" is "1", "ON" having a high frequency is set as the default value.

Thus, the default value calculation process ends.

Figure 10:
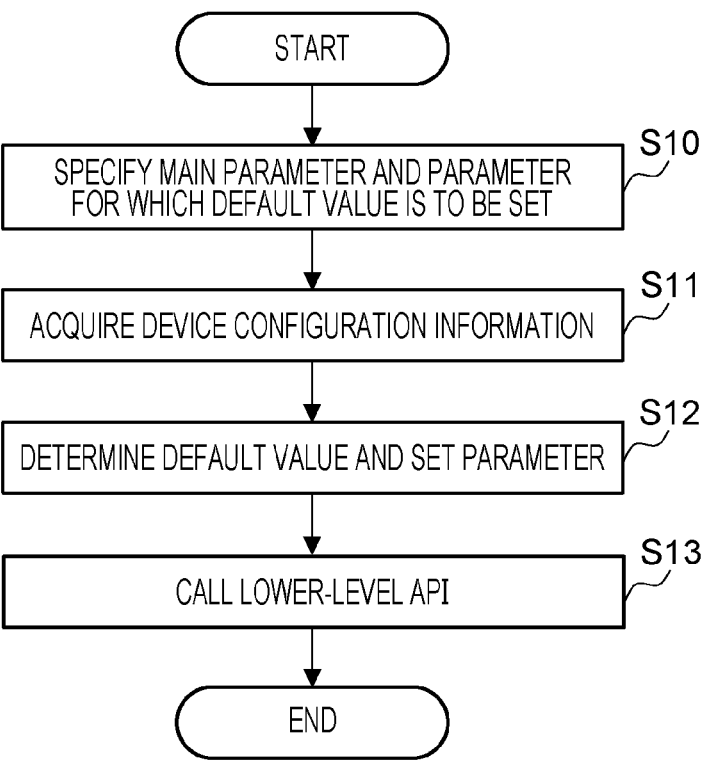
FIG. 10 is a flowchart illustrating a process procedure of an insufficient parameter setting process.

Meanwhile, FIG. 10 illustrates a procedure of an insufficient parameter setting process executed by the parameter designation program 50 (FIG. 3) of the higher-level API processing program 44 (FIG. 3) when the administrator 4 operates the administrator terminal 5 to transmit the higher-level API call 6 (FIG. 1) to the host API processing computer 3.

According to the process procedure illustrated in FIG. 10, the higher-level API processing program 44 generates a lower-level API call 7 (FIG. 1) in which an API parameter not designated by the higher-level API call 6 is set to a predetermined default value, and transmits the generated lower-level API call 7 to the storage device 2 as a target so as to call a corresponding lower-level API.

Actually, this insufficient parameter setting process is started when the higher-level API processing program 44 receives the higher-level API call 6 from the administrator terminal 5. Then, first, the parameter designation program 50 of the higher-level API processing program 44 refers to the received higher-level API call 6 to specify a main parameter and an API parameter for which a default value is to be set (S10).

This specifying can be performed by referring to an API name in the higher-level API call 6, searching for an API parameter having the same API name in the default value management table 26 (FIG. 7), and determining whether or not a main parameter or a parameter corresponding to the API parameter is included in the higher-level API call 6.

For example, in the examples illustrated in FIGS. 1 and 7, the API name in the higher-level API call 6 is "set_copy_option", and this API name matches the API name of the default value management table 26 illustrated in FIG. 7. In this case, as illustrated in FIG. 1, the higher-level API call 6 has "speed" which is a main parameter and has a value set to "fast", but does not have "option123" which is the API parameter illustrated in FIG. 7 as a parameter. Therefore, the parameter designation program 50 specifies "option123" as a parameter for which a default value needs to be set in the higher-level API call 6.

Subsequently, the parameter designation program 50 acquires the device configuration information 12 of the storage device 2 for which the lower-level API is called (S11). In this processing, the device configuration information 12 of the target storage device 2 stored in the API execution log/device configuration information database 23 already held by the host API processing computer 3 may be acquired, or the latest device configuration information 12 may be acquired again from the target storage device 2 by the parameter designation program 50.

Note that the device configuration information 12 acquired in this case is information of items defined in the item field constituting the classification axis field 26A (FIG. 7) of the default value management table 26. In the example illustrated in FIG. 7, as described above, the default value management table 26 has the model field 26AAA and the disk type field 26AAB as the classification axis field 26A. For example, when the content of the device configuration information 12 is the content illustrated in FIG. 5, the model can be acquired as "Model 900" and the disk type can be acquired as "SSD".

Next, the parameter designation program 50 determines a default value of a target API parameter using the main parameter acquired in step S10 and the device configuration information 12 acquired in step S11, and sets the API parameter and the default value in the higher-level API call 6 (S12).

For example, in the example illustrated in FIG. 7, in the current higher-level API call 6, the model of the target storage device 2 is "Model 900", the disk type is "SSD", and the value of the main parameter is "fast". Therefore, in the higher-level API call 6, the parameter designation program 50 determines the default value of the API parameter "option123" to be "ON", and adds the determined API parameter "option123" to the higher-level call 6 as "ON".

Thereafter, the higher-level API processing program 44 transmits the higher-level API call 6 having the API parameter and the default value thereof added thereto as the lower-level API call 7 (FIG. 1) to the lower-level API processing unit 10 (FIG. 1) of the target storage device 2 to call the corresponding lower-level API (S13). As described above, this series of processing ends.

As a method of determining the default value in step S12, another method can be applied. For example, in a case where there is no entry that completely matches the device configuration of the target storage device 2 in the default value management table 26, an entry having similar contents (the value of the device configuration and the main parameter are close or the number of matched items is large) may be referenced, and the value of a corresponding parameter may be determined as a default value of the entry. By doing so, it is possible to set an appropriate parameter value, and it is possible to reduce the possibility of a defect caused by setting of an inappropriate API parameter.

In addition, in a case where there is no entry that completely matches the configuration of the target storage device 2, the higher-level API call 6 may be interrupted to notify the administrator 4 that the parameter designation has not been completed, and the administrator 4 may be prompted to designate a parameter. Even in this case, it is possible to reduce the possibility of a defect caused by setting of an inappropriate API parameter.

According to the hybrid cloud storage system 1 having the above configuration according to the present embodiment, the administrator 4 can make an API call to the storage devices 2 without designating all API parameters required by a lower-level API. As a result, it is possible to save the effort of the administrator 4, such as learning and man-hours for setting an API parameter necessary for managing the storage devices 2. Therefore, according to the hybrid cloud storage system 1, it is possible to reduce the management cost of the entire system by reducing the labor and time of the administrator 4 required for an API call.

(2) Second Embodiment

Figure 11:
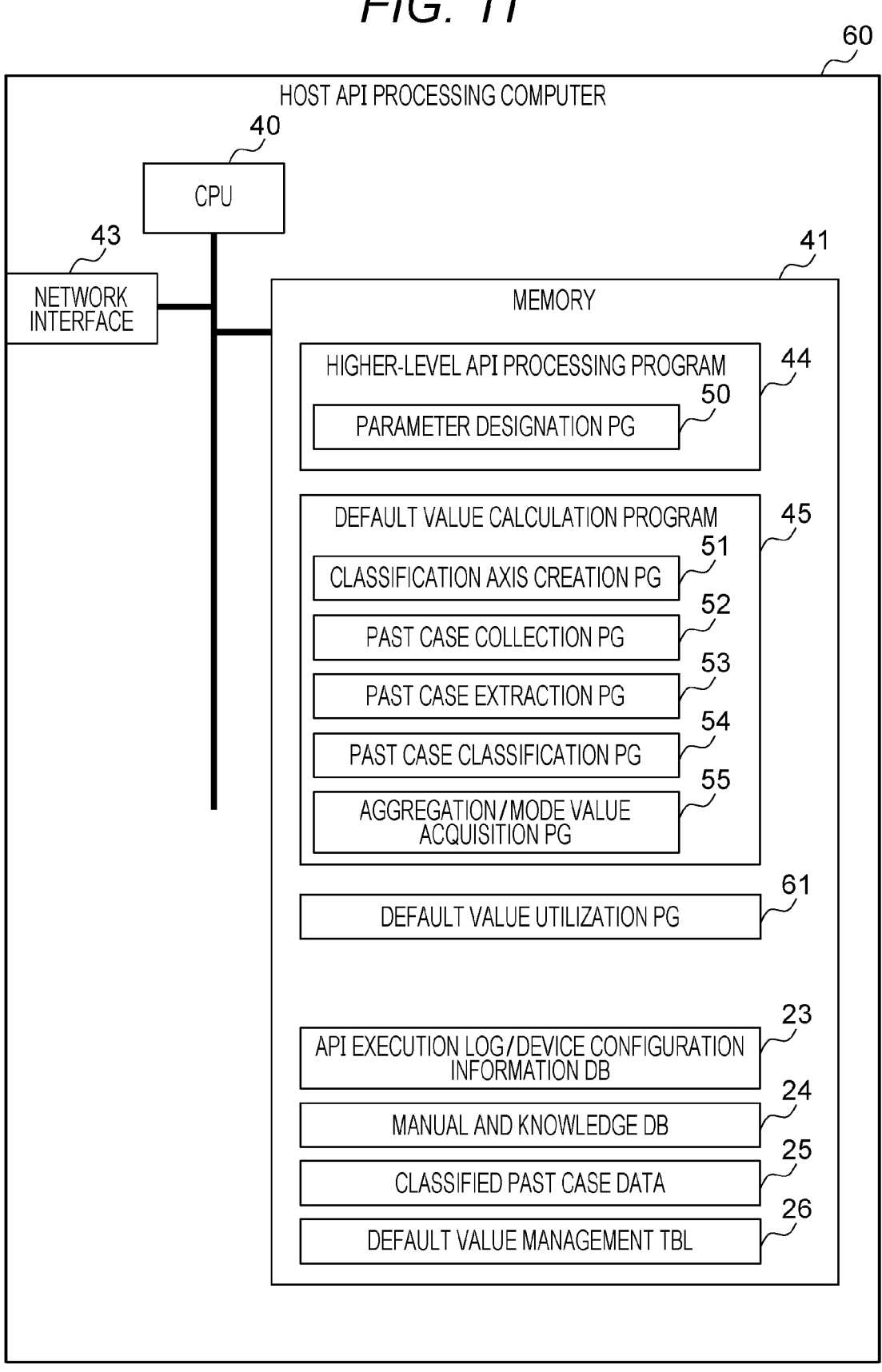
FIG. 11 is a block diagram illustrating a configuration of a host API processing computer according to a second embodiment.

FIG. 11, in which the same reference signs are given to parts corresponding to the parts illustrated in FIG. 3, illustrates a configuration of a host API processing computer according to a second embodiment applied to the hybrid cloud storage system 1 described above with reference to FIG. 1 instead of the host API processing computer 3 according to the first embodiment. The host API processing computer 60 is configured similarly to the host API processing computer 3 according to the first embodiment except that a default value utilization program 61 is additionally stored in a memory 41.

The default value utilization program 61 is a program that utilizes the default values of the API parameters determined in the default value calculation processing described above with reference to FIG. 8 for purposes other than the designation of the API parameter in the lower-level API call 7 (FIG. 1).

For example, in the first embodiment, the higher-level API processing program 44 makes the lower-level API call 7 by filling the value of the unset API parameter in the higher-level API call 6 (FIG. 1) with the default value. On the other hand, when an unset API parameter is present in the higher-level API call 6, the default value utilization program 61 treats the higher-level API call 6 as a failure, and notifies the administrator terminal 5 of the default value determined in step S12 of the higher-level API processing described above with reference to FIG. 10 as a recommended value of the unset API parameter, and causes the administrator terminal 5 to display the default value.

In the host API processing computer 3 according to the present embodiment, the administrator 4 can set in advance which of the processing by the default value utilization program 61 and the processing (processing of filling a value of an unset API parameter in the higher-level API call 6 with a default value and transmitting the value to the storage device 2 for the lower-level API call 7) by the higher-level API processing program 44 as described above is executed, from a setting screen or the like.

In addition, even in a case where the value of the API parameter is designated in the higher-level API call 6, the default value utilization program 61 compares the default value determined in steps S10 to S12 of the higher-level API processing (FIG. 10) with the value of the API parameter set by the administrator 4 for the default value of the API parameter. In a case where the determined default value is different by a certain value or greater from the value of the API parameter set by the administrator 4, the default value program utilization 61 notifies the administrator terminal 5 that the determined default value is different from the value of the API parameter set by the administrator 4, and causes the administrator terminal 5 to display the difference. As a result, it is possible to warn the administrator 4 that there is a possibility that an inappropriate parameter value is set in the higher-level API call 6.

Note that, in this case, the default value utilization program 61 temporarily stops the higher-level API processing program 44 from making the lower-level API call 7 by filling a value of the unset API parameter in the higher-level API call 6 (FIG. 1) with the default value. Thereafter, when an instruction to continue the processing is given from the administrator terminal 5 in response to the operation of the administrator 4, the default value utilization program 61 gives an instruction to resume the stopped processing to the higher-level API processing program 44.

In addition, when an instruction to change the value of the unset API parameter from the value set by the administrator 4 to the default value determined in steps S10 to S12 of the higher-level API processing (FIG. 10) is given from the administrator terminal 5 in response to the operation of the administrator 4, the default value utilization program 61 gives an instruction to change the API parameter value to the default value and restart the processing to the higher-level API processing program 44.

According to the host API processing computer 60 having the above configuration according to the present embodiment, the administrator 4 can receive presentation of a parameter value of an appropriate API parameter or a warning about a parameter value set by the administrator 4 based on a result of a past API call case. As a result, according to the host API processing computer 60 according to the present embodiment, it is possible to reduce the possibility of occurrence of a defect caused by designation of an inappropriate parameter value.

(3) Third Embodiment

In the first embodiment, by repeatedly performing the default value calculation process described above with reference to FIG. 8, the number of pieces of the manual and knowledge 24A accumulated in the manual and knowledge database 24 increases over time, and it can be expected that more appropriate default values of the parameters are determined.

Therefore, in the present embodiment, in addition to periodically executing the default value calculation process as in the first embodiment, the default value calculation process is also executed at other timings to continuously improve the default values.

Figure 12:
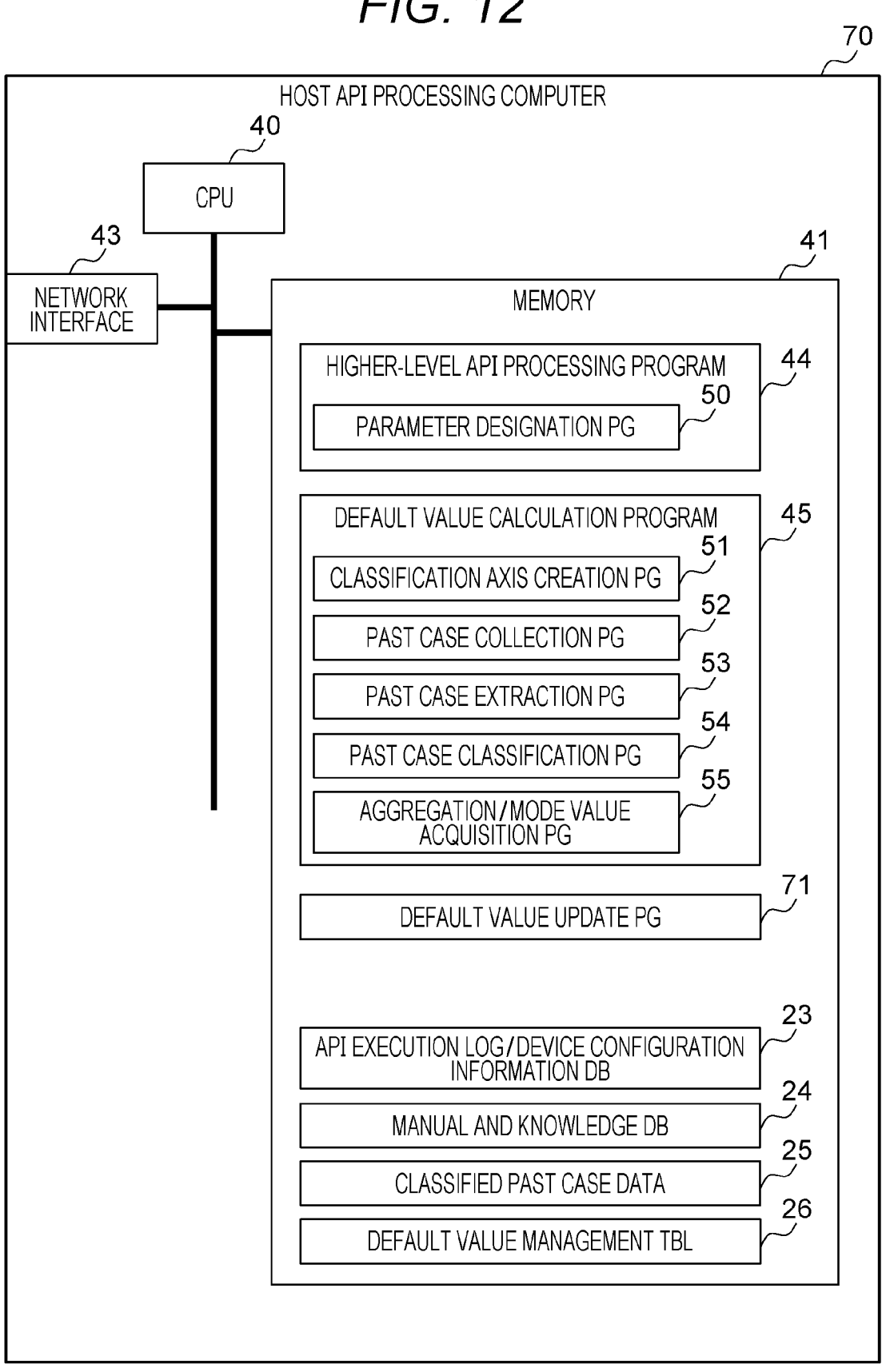
FIG. 12 is a block diagram illustrating a configuration of a host API processing computer according to a third embodiment.

FIG. 12, in which the same reference signs are given to parts corresponding to the parts illustrated in FIG. 3, illustrates a configuration of a host API processing computer 70 according to the third embodiment constructed based on such a purpose. The host API processing computer 70 is a computer applied to the hybrid cloud storage system 1 described above with reference to FIG. 1 instead of the host API processing computer 3 according to the first embodiment, and is different from the host API processing computer 3 according to the first embodiment in that a default value update program 71 is additionally stored in a memory 41.

The default value update program 71 is executed at a predetermined trigger and executes the default value calculation process described above with reference to FIG. 8. Specifically, the default value update program 71 executes the default value calculation process, for example, when a failure case occurs beyond a threshold value in the storage device 2 having a certain device configuration and a certain parameter. In this case, a further increase in the number of failure cases can be prevented by reviewing existing default values that could cause failure to recur.

As another example, the default value calculation process is executed when the administrator 4 or the administrator of the host API processing computer 3 clearly gives an instruction. This is effective, for example, in a case where a new fatal failure case and a factor thereof are found and related parameters need to be changed immediately.

As still another example, the default value calculation process can be executed at a timing when the manual and knowledge 24A of the type illustrated in FIG. 6D targeted in step S1 of the previous default value calculation process are changed. This is because when the manual and knowledge 24A of the type illustrated in FIG. 6D are changed, the classification axis can be changed, and thus it is important to reflect the effect of the change in the classification axis in the default value management table 26 at an early stage.

According to the host API processing computer 70 having the above configuration according to the present embodiment, the administrator 4 can continuously hold a more appropriate default value of the API parameter based on accumulation of past API call cases, and can reduce the possibility of occurrence of a defect caused by inappropriate parameter designation.

(4) Fourth Embodiment

In the first embodiment, the default value management table 26 (FIG. 7) is created for each combination of an API name and an API parameter. Meanwhile, according to this method, the default value management table 26 is created in a state where API execution logs 11 of a large number of storage devices 2 and user environments are mixed.

However, a parameter of each storage device 2 is affected by a method of using the storage device 2 in addition to a device configuration and main parameters. For example, an optimal parameter for an application for obtaining a data read/write response latency in the storage device 2 is different from an optimal parameter for an application for obtaining a data transfer speed in the storage device 2.

Therefore, in the present embodiment, the default value management table 26 is created for each of owners of the storage devices 2. Specifically, the past case collection program 52 of the default value calculation program 45 collects, for each of the owners of the storage devices 2, an API execution log 11 and device configuration information 12 from the storage device 2 owned by the owner, the past case classification program 54 classifies the API execution log 11 for each owner in the same manner as described above, and the aggregation/mode value acquisition program 55 determines a default value of an API parameter for each owner. In addition, the parameter designation program 50 of the higher-level API processing program 44 uses the default value management table 26 of the owner who owns the storage device 2 for which the lower-level API is called in step S12 of the insufficient parameter setting process described above with reference to FIG. 10.

According to the host API processing computer 70 having the above configuration according to the present embodiment, the administrator 4 can use the default value calculated from the API execution log 11 of the storage device 2 owned by the same owner, and thereby can designate a parameter that matches the method of using the own storage device 2 or a usage environment in which the own storage device 2 is used.

(5) Fifth Embodiment

When the default value management table 26 (FIG. 7) is updated by the processing of the default value update program 71 according to the third embodiment, there is a possibility that the API parameter designated according to the previous default value management table 26 becomes inappropriate.

Therefore, in the present embodiment, when there is a change in the default value management table 26, a host API processing computer that modifies the API parameter of each storage device 2 designated in the past according to the default value management table 26 is proposed.

Figure 13:
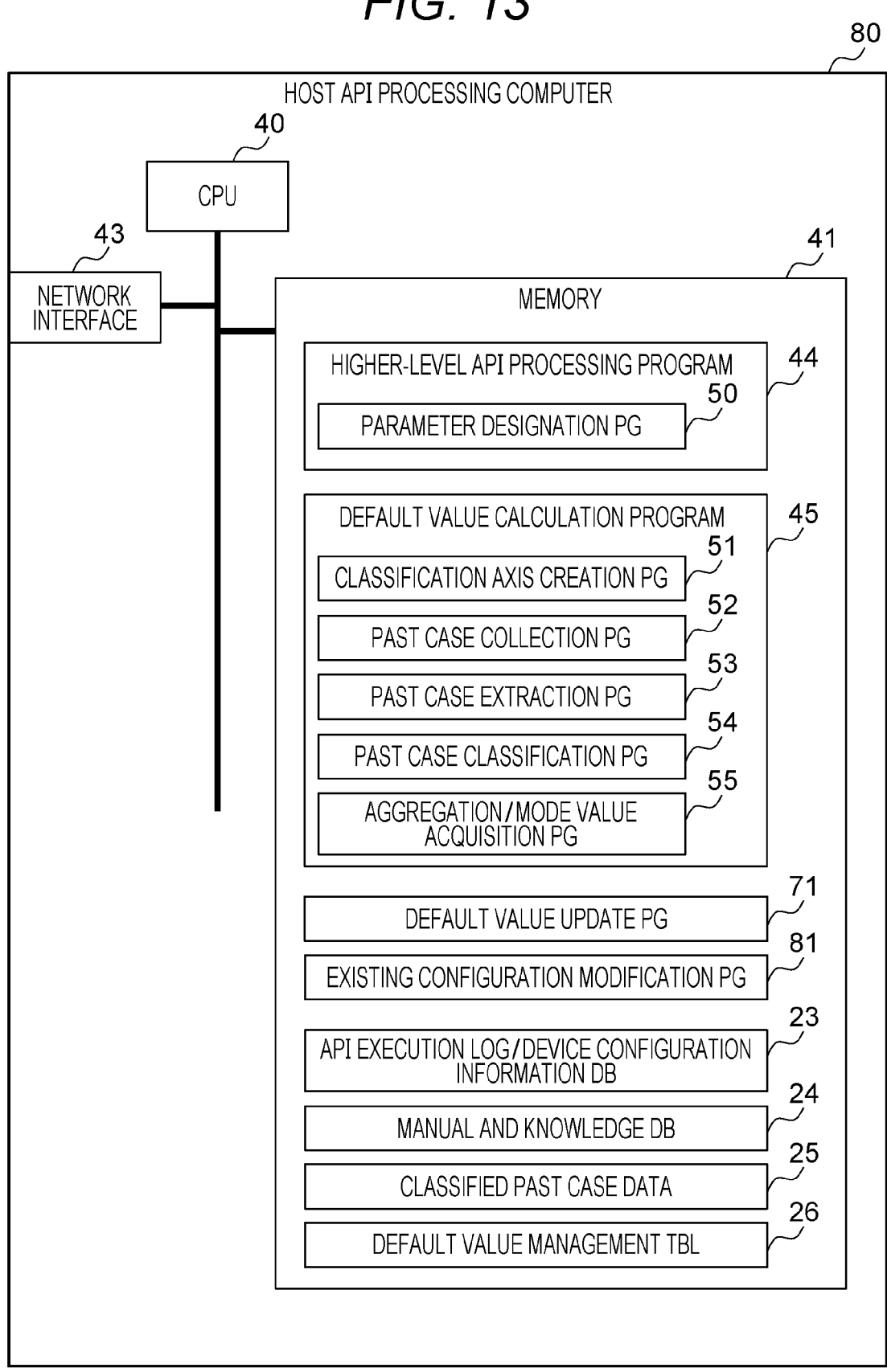
FIG. 13 is a block diagram illustrating a configuration of a host API processing computer according to a fourth embodiment.

FIG. 13, in which the same reference signs are given to parts corresponding to the parts illustrated in FIG. 12, illustrates a configuration of a host API processing computer 80 according to the present embodiment. The host API processing computer 80 is a computer applied to the hybrid cloud storage system 1 described above with reference to FIG. 1 instead of the host API processing computer 70 according to the third embodiment, and is configured similarly to the host API processing computer 70 according to the third embodiment except that an existing configuration modification program 81 is additionally stored in a memory 41.

Figure 14:
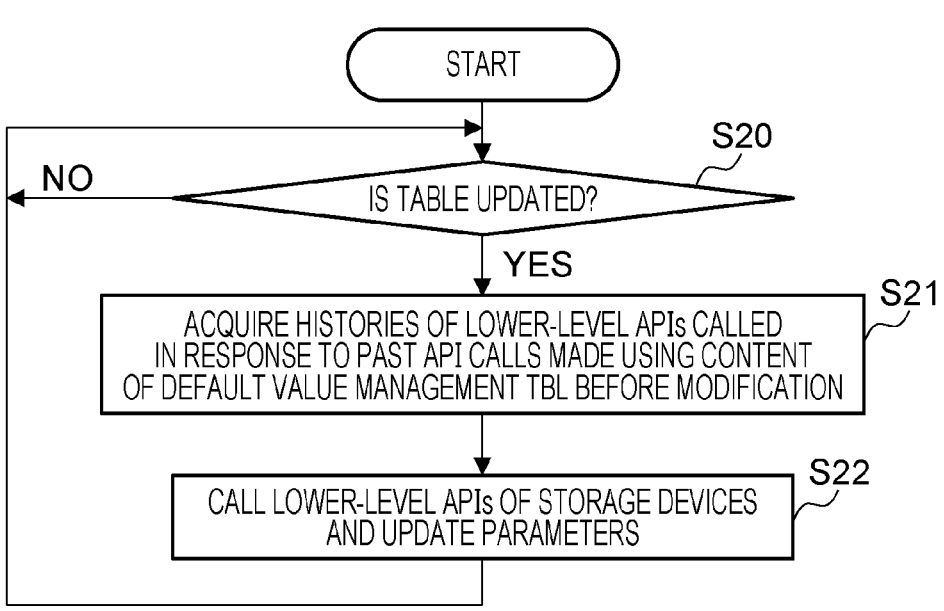
FIG. 14 is a flowchart illustrating a process procedure of an existing configuration modification process.

FIG. 14 illustrates a parameter modification process executed by the existing configuration modification program 81. This parameter modification process is started when the host API processing computer 80 is powered on. Then, the existing configuration modification program 81 monitors whether or not the content of the default value management table 26 has been changed (S20).

Then, when detecting any change in the content of the default value management table 26, the existing configuration modification program 81 refers to the API execution log/device configuration information database 23 and detects all histories of the lower-level APIs called in response to the past lower-level API calls 7 (FIG. 1) made using the content (default value) of the default value management table 26 before modification (S21). Note that, in the detected histories of the lower-level APIs, a lower-level API for which an operation target has already become invalid due to a change in settings or deletion is excluded from targets. In addition, an API parameter that cannot be changed once created is also excluded from the targets.

Subsequently, the existing configuration modification program 81 determines a new default value of an API parameter based on the content of the default value management table 26 after the change with respect to the API parameter of which the default value is determined according to the content of the default value management table 26 before modification, and executes again the lower-level API call 7 to which the determined new default value is applied.

According to the host API processing computer 80 having the above configuration according to the present embodiment, it is possible to continuously improve the setting of the storage device 2 performed in the past along with a change in the default value management table 26, and thus, it is possible to prevent the occurrence of a defect in advance.

(6) Other Embodiments

In the first to fifth embodiments described above, the case where the devices to be managed are the storage devices 2 has been described, but the present invention is not limited thereto, and can be widely applied even in a case where a target device is other than the storage devices 2.

Furthermore, in the first to fifth embodiments described above, the host API processing computers 3, 60, 70, and 80 may include a plurality of computer devices (for example, a plurality of computer devices constituting a distributed computing system), and various programs (the parameter designation program 50 of the higher-level API processing program 44, and the classification axis creation program 51, the past case collection program 52, the past case extraction program 53, the past case classification program 54, and the aggregation/mode value acquisition program 55 of the default value calculation program 45) implemented in the host API processing computer 3 described above with reference to FIG. 3 and various types of information (the API execution log/device configuration information database 23, the manual and knowledge database 24, the classified past case data 25, and the default value management table 26) held by the host API processing computers 3, 60, 70, and 80 may be distributed and arranged in the plurality of computer devices.

For example, the higher-level API processing program 44 and the default value calculation program 45 may be executed on different computer devices, the default value management table 26 in which the default values calculated by the default value calculation program 45 are stored may be copied and held between these computer devices, and the higher-level API processing program 44 executed by another computer device may use the default value management table 26.

Further, the API execution log/device configuration information database 23, the manual and knowledge database 24, the classified past case data 25, and the default value management table 26 may be stored in a place other than the memory 41 as long as the higher-level API processing program 44 and the default value calculation program 45 can access the API execution log/device configuration information database 23, the manual and knowledge database 24, the classified past case data 25, and the default value management table 26. For example, the API execution log/device configuration information database 23, the manual and knowledge database 24, the classified past case data 25, and the default value management table 26 may be stored in a non-volatile storage medium such as a hard disk device, an SSD, or a DVD, or a database constructed on another computer.

Furthermore, in the first to fifth embodiments described above, the case has been described in which a first collection unit that collects, as a manual and knowledge, information regarding an API parameter of a target device from the outside, a classification axis creation unit that extracts a description regarding a device configuration, a main parameter, and a specific parameter for which a value is to be set from the manual and knowledge collected by the first collection unit, and creates a classification axis based on the device configuration and the main parameter included in the extracted description, a second collection unit that collects an API execution log and configuration information from the target device, a classification unit that classifies the API execution log collected by the second collection unit according to the classification axis, a determination unit that aggregates a setting value of a specific parameter in the API execution log for each classification, and determines a most frequent setting value as a default value of the specific parameter, a processing unit that transmits, to the device, a lower-level API call obtained by setting, in the higher-level API call, a default value corresponding to a combination of the device configuration of the target device and the main parameter in the higher-level API call as a value of the specific parameter in a case where the specific parameter is not set in the high-level API call are configured by the past case collection program 52, the classification axis creation program 51, the past case collection program 52, the past case classification program 54, and the aggregation/mode value acquisition program 55, respectively. However, the present invention is not limited thereto, and these functional units may be configured by hardware.

Similarly, in the second embodiment, the case has been described in which a first default value utilization unit that transmits the default value of the specific parameter determined by the determination unit to a host computer as a recommended value of the specific parameter in a case where the value of the specific parameter is not set in the higher-level API call, and a second default value utilization unit that compares the designated value of the specific parameter with the default value of the specific parameter determined by the determination unit in a case where the value of the specific parameter is set in the higher-level API call, and notifies the computer that the designated value of the specific parameter is different from the default value of the specific parameter determined by the determination unit in a case where the designated value of the specific parameter is different by a certain value or greater from the default value of the specific parameter determined by the determination unit are configured by the default value utilization program 61. However, the present invention is not limited thereto, the first and second default value utilization units may be configured by hardware.

Furthermore, in the fifth embodiment described above, the case where the default value update program 71 and the existing configuration modification program 81 are implemented in the host API processing computer 80 (FIG. 13) has been described. However, the present invention is not limited thereto. In addition to the default value update program 71 and the existing configuration modification program 81, the default value utilization program 61 (FIG. 11) described above in the second embodiment may be implemented in the host API processing computer 80. By doing so, it is possible to further reduce the possibility of occurrence of a defect caused by designation of an inappropriate parameter value.

The present invention can be applied to an information processing apparatus that makes a lower-level API call based on a higher-level API call output from a host computer to a target device.

What is claimed is:

1. An information processing apparatus that makes a lower-level application programming interface (API) call to a target device based on a higher-level API call made by a host computer, the information processing apparatus comprising:

a first collection unit that collects, as a manual and knowledge, information regarding an API parameter of the target device from an outside;

a classification axis creation unit that extracts a description regarding a device configuration, a main parameter, and a specific parameter for which a value is to be set from the manual and knowledge collected by the first collection unit and creates a classification axis based on the device configuration and the main parameter included in the extracted description;

a second collection unit that collects an API execution log and configuration information from the target device;

a classification unit that classifies the API execution log collected by the second collection unit according to the classification axis;

a determination unit that aggregates a setting value of the specific parameter the API in execution log for each classification, and determines a most frequent setting value as a default value of the specific parameter; and a processing unit that transmits, to the device, the lower-level API call obtained by setting, in the higher-level API call, the default value corresponding to a combination of the device configuration of the target device and the main parameter in the higher-level API call as a value of the specific parameter in a case where the specific parameter is not set in the higher-level API call.

2. The information processing apparatus according to claim 1, wherein the determination unit does not include the API execution log of a case where normal termination has not been performed in aggregation of a setting value of the API parameter in the API execution log.

3. The information processing apparatus according to claim 1, wherein the determination unit weights a frequency value for the device configuration of the target device that is normally operated for a long period of time in aggregation of a setting value of the API parameter in the API execution log.

4. The information processing apparatus according to claim 1, wherein in a case where the combination that completely matches the device configuration of the current target device is not present, the processing unit determines a value of the API parameter as the default value corresponding to the similar combination.

5. The information processing apparatus according to claim 1, wherein the manual and the knowledge are information of a document written by a person.

6. The information processing apparatus according to claim 1, wherein when a failure case occurs beyond a threshold value in the target device, the first collection unit collects the information regarding the API parameter of the target device from the outside as the manual and the knowledge, the second collection unit collects the API execution log and the configuration information from the target device, the classification unit extracts the device configuration and the main parameter from the manual and knowledge collected by the first collection unit, and classifies the API execution log according to a combination of the extracted device configuration and a value of the extracted main parameter, and the determination unit aggregates a setting value of the API parameter in the classified API execution log for each combination, and determines a most frequent setting value as a default value of the API parameter.

7. The information processing apparatus according to claim 1, further comprising a first default value utilization unit that transmits the default value of the specific parameter determined by the determination unit to the host computer as a recommended value of the specific parameter in a case where the value of the specific parameter is not set in the higher-level API call, whether either the processing by the determination unit or the processing by the default value utilization unit is to be executed can be set in advance.

8. The information processing apparatus according to claim 1, further comprising a second default value utilization unit that compares a designated value of the specific parameter with the default value of the specific parameter determined by the determination unit in a case where the value of the specific parameter is set in the higher-level API call, and notifies the host computer that the designated value of the specific parameter is different from the default value of the specific parameter determined by the determination unit in a case where the designated value of the specific parameter is different by a certain value or greater from the default value of the specific parameter determined by the determination unit.

9. The information processing apparatus according to claim 1, wherein when a change is made in the manual and the knowledge, the first collection unit collects the information regarding the API parameter of the target device from the outside as the manual and the knowledge, the second collection unit collects the API execution log and the configuration information from the target device, the classification unit extracts the device configuration and the main parameter from the manual and knowledge collected by the first collection unit, and classifies the API execution log according to a combination of the extracted device configuration and a value of the extracted main parameter, and the determination unit aggregates a setting value of the API parameter in the classified API execution log for each combination, and determines a most frequent setting value as a default value of the API parameter.

10. The information processing apparatus according to claim 1, wherein the second collection unit collects, for each owner of the target device, the API execution log and the configuration information from the target device owned by the owner, the classification unit classifies the API execution log for each owner, and the determination unit determines a default value of the API parameter for each owner.

11. The information processing apparatus according to claim 9, wherein in a case where the default value of the API parameter is changed to a new default value due to a change in the manual and the knowledge, the past lower-level API call made by using the default value before the change is made again by using the new default value.

12. An information processing method that is performed by an information processing apparatus that makes a lower-level application programming interface (API) call to a target device based on a higher-level API call made by a host computer, the information processing method comprising:

collecting, as a manual and knowledge, information regarding an API parameter of the target device from an outside;

extracting a description regarding a device configuration, a main parameter, and a specific parameter for which a value is to be set from the manual and knowledge collected and creating a classification axis based on the device configuration and the main parameter included in the extracted description;

collecting an API execution log and configuration information from the target device;

classifying the collected API execution log according to the classification axis;

aggregating a setting value of the specific parameter in the API execution log for each classification, and determining a most frequent setting value as a default value of the specific parameter; and transmitting, to the device, the lower-level API call obtained by setting, in the higher-level API call, the default value corresponding to a combination of the device configuration of the target device and the main parameter in the higher-level API call as a value of the specific parameter in a case where the specific parameter is not set in the higher-level API call.

* * * * *